United States Patent
Hwang et al.

(10) Patent No.: US 8,611,416 B2
(45) Date of Patent: Dec. 17, 2013

(54) METHOD AND APPARATUS FOR DETERMINING ENCODING MODE BY USING TEMPORAL AND SPATIAL COMPLEXITY

(75) Inventors: In-Seong Hwang, Seoul (KR); Hoo-Jong Kim, Seoul (KR)

(73) Assignee: SK Planet Co., Ltd. (KR)

( * ) Notice: Subject to any disclaimer, the term of this patent is extended or adjusted under 35 U.S.C. 154(b) by 550 days.

(21) Appl. No.: 12/812,890

(22) PCT Filed: Jan. 28, 2009

(86) PCT No.: PCT/KR2009/000400
§ 371 (c)(1),
(2), (4) Date: Jul. 14, 2010

(87) PCT Pub. No.: WO2009/093879
PCT Pub. Date: Jul. 30, 2009

(65) Prior Publication Data
US 2011/0051801 A1    Mar. 3, 2011

(30) Foreign Application Priority Data
Jan. 24, 2008    (KR) .................. 10-2008-0007666

(51) Int. Cl.
*H04N 7/26*    (2006.01)
(52) U.S. Cl.
USPC .................................................. 375/240.02
(58) Field of Classification Search
USPC ..................................... 375/240.01, 240.02
IPC ................................................... H04N 7/26
See application file for complete search history.

(56) References Cited

U.S. PATENT DOCUMENTS

| 5,682,204 A | 10/1997 | Uz et al. |
| 5,832,234 A | 11/1998 | Iverson et al. |
| 7,280,708 B2 | 10/2007 | Song et al. |
| 2002/0114394 A1* | 8/2002 | Ma ........................ 375/240.16 |
| 2004/0233989 A1* | 11/2004 | Kobayashi et al. ....... 375/240.16 |
| 2005/0276504 A1* | 12/2005 | Chui et al. .................... 382/264 |

(Continued)

FOREIGN PATENT DOCUMENTS

| JP | 08-102938 | 4/1996 |
| JP | 08-126013 | 5/1996 |
| KR | 1020060027813 | 3/2006 |
| KR | 1020090055717 | 6/2009 |

OTHER PUBLICATIONS

Ling-Jiao Pan, et al., "Fast Mode Decision Algorithms for Inter/Intra Prediction in H.264 Video Coding", Gwangju Institute of Science & Technology, Dec. 11, 2007,, pp. 158-167.

(Continued)

*Primary Examiner* — Y Lee
*Assistant Examiner* — Yulin Sun
(74) *Attorney, Agent, or Firm* — Baker & Hostetler LLP

(57) ABSTRACT

A method and apparatus for deciding an encoding mode are disclosed. The encoding mode decision apparatus comprises a temporal complexity calculator to calculate a temporal complexity of a macroblock and a mode decider to elect the encoding mode utilizing the temporal complexity. The disclosure calculates the temporal and spatial complexes for the macroblocks more accurately as well as elects the optimal encoding mode using the same resulting in a reduction of the calculation complexity when applying the rate-distortion technique along with an improvement of its processing speed.

16 Claims, 4 Drawing Sheets

(56) References Cited

U.S. PATENT DOCUMENTS

| | | | |
|---|---|---|---|
| 2007/0092146 A1* | 4/2007 | Alvarez et al. | 382/236 |
| 2007/0140352 A1* | 6/2007 | Bhaskaran et al. | 375/240.24 |
| 2008/0158426 A1* | 7/2008 | Chiu | 348/607 |

OTHER PUBLICATIONS

D. Wu, et al., "Fast Intermode Decision in H.264/AVC Video Coding", IEEE Transactions on Circuits & Systems for Video Technology, vol. 15, No. 7, Jul. 1, 2005, pp. 953-958.

Cheng-Dong Shen, et al., "A Hierarchical Framework for Fast Macroblock Prediction Mode Decision in H.264", School of Computer Science, National Univ. of Defense Technology, Jan. 1, 2006, pp. 827-834.

Guo Zairong, et al., Fast Inter Mode Decision and Motion Estimation Algorithm for H.264, State Key Lab. of Info. Engineering in Surveying, Mapping & Remote Sensing, Wuhan Univ., Wuhan 430079, School of Electronics Info., Wuhan Univ., Wuhan 430079, pp. 30-32.

* cited by examiner

FIG. 4A

| 1 | 1 | 1 | 1 |
|---|---|---|---|
| 1 | 1 | -1 | -1 |
| 1 | -1 | -1 | 1 |
| 1 | -1 | 1 | -1 |

FIG. 4B

| 1 | 0 | -1 |
|---|---|---|
| 5 | 0 | -5 |
| 20 | 0 | -20 |
| 5 | 0 | -5 |
| 1 | 0 | -1 |

FIG. 4C

| 1 | 5 | 20 | 5 | 1 |
|---|---|---|---|---|
| 0 | 0 | 0 | 0 | 0 |
| -1 | -5 | -20 | -5 | -1 |

METHOD AND APPARATUS FOR DETERMINING ENCODING MODE BY USING TEMPORAL AND SPATIAL COMPLEXITY

FIELD

The present disclosure relates to an encoding mode decision apparatus and method using temporal and spatial complexities. More particularly, the present invention relates to an apparatus and method for deciding encoding mode by way of a rate-distortion optimization to minimize the calculation of a rate-distortion cost (RD cost).

BACKGROUND

The statements in this section merely provide background information related to the present disclosure and may not constitute prior art.

Typical video compression schemes of the standards MPEG-1, MPEG-2, MPEG-4 Visual, H.261, H.263 and H.264/MPEG-4 AVC (Advanced Video Coding) compress video data by dividing each frame into a multitude of macroblock units, by which a predicted block is obtained through a prediction process, and then transforming and quantizing the difference between the original video block and the predicted block.

An intra prediction and inter prediction are two available prediction methods. The intra prediction performs the current block prediction by utilizing data of blocks that are present surrounding the current frame. The inter prediction generates a predicted block corresponding to the current block from previously encoded one or more video frames by utilizing a block-based motion compensation.

Particularly, in the inter prediction event, H.264/MPEG-4 AVC performs the motion prediction not by using a set dimension of block but with seven different block modes of 4×4 to 16×16 varieties.

FIG. 1a illustrates blocks of various sizes used in the conventional variable block-size motion prediction of H.264/MPEG-4 AVC.

As shown, the respective macroblock luminance components (a 16×16 sample) may be divided in four ways. In other words, each macroblock may be a single 16×16 macroblock, two 16×8 partitions thereof, two 8×16 partitions, or four 8×8 partitions to be motion predicted.

In addition, if an 8×8 mode were selected, four 8×8 sub-macroblocks of a macroblock may be subdivided into four ways, respectively. Specifically, with the selection of the 8×8 mode each 8×8 block may take one of four shapes comprising a single 8×8 sub-macroblock partition, two divided 8×4 sub-macroblock partitions, two divided 4×8 sub-macroblock partitions, and four divided 4×4 sub-macroblock partitions.

Within the respective macroblocks, these partitions and the sub-macroblocks may be related in numerous combinations. This method of dividing macroblocks into different sizes of sub-blocks is called tree structured motion compensation.

To decide the best encoding mode for a macroblock, according to the H.264 standard, the rate-distortion optimization is used. Typical rate-distortion optimization equation is as follows:

$$J_{mode} = D + \lambda_{mode} \cdot R \qquad \text{Equation 1}$$

where $J_{mode}$ is a rate-distortion cost, $\lambda_{mode}$ is Lagrangian multiplier, D is a value of distortion between an original macroblock and a reconstructed macroblock, and R is a coefficient to reflect the number of bits related to mode selection and the quantization value of the macroblock among others. Using Equation 1, the respective macroblocks are preliminarily encoded at the level of the different size-variable block divisions before deciding the mode with the lowest rate-distortion cost as the optimum mode.

In other words, the encoder carries out encoding in all the predicted encoding modes and then calculates rate-distortion costs to decide the prediction mode with the lowest rate-distortion cost as the prediction mode for use in the actual encoding process.

Although this technique of the rate-distortion optimization may dramatically improve the compression performance of the H.264/AVC encoder value as the optimum mode, the resulting increased complexity is a critical obstacle to the real-time encoding.

FIG. 1b illustrates the calculating complexity by performing the rate-distortion optimization. As illustrated in FIG. 1b, to perform the rate-distortion optimization increases the calculation complexity to at least seven to eight times greater than otherwise.

So, there is a practical need to provide a technology for the encoder to compress videos to minimize the compression speed and dramatically lower the calculation complexity while maintaining the compression performance using the rate-distortion optimization.

SUMMARY

In view of the stated needs to satisfy, the present disclosure seeks to provide an apparatus and method for deciding encoding mode by way of a rate-distortion optimization to minimize the calculation of a rate-distortion cost.

One embodiment provides an encoding mode decision apparatus using a temporal complexity comprising: a temporal complexity calculator to calculate a temporal complexity of a macroblock; and a mode decider to decide the encoding mode utilizing the temporal complexity.

Another embodiment provides an encoding mode decision apparatus using a spatial complexity comprising: a spatial complexity calculator to calculate a spatial complexity of a macroblock; and a mode decider to decide the encoding mode utilizing the spatial complexity.

Yet another embodiment provides an encoding mode decision method using temporal and spatial complexities, the method comprising and performing through an encoding mode decision apparatus: calculating a temporal complexity of a macroblock; calculating a spatial complexity of a macroblock; deciding an intra block mode as the encoding mode if the temporal complexity is greater than a predetermined temporal threshold; and deciding an inter block mode as the encoding mode if the temporal complexity is less than or equal to the temporal threshold.

As described above, according to the disclosure, it is not only possible to provide more accurate calculations of the temporal and spatial complexities of a macroblock but elect the optimal encoding mode using the same resulting in a substantially reduced calculation complexity when using the rate-distortion optimization technique as well as an improved video processing speed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4A shows the Hadamard transform matrix used to calculate the temporal complexity, FIG. 4B shows a vertical filter used to calculate the spatial complexity, and FIG. 4C shows a horizontal filter used to calculate the special complexity.

DETAILED DESCRIPTION

Figure 1A:
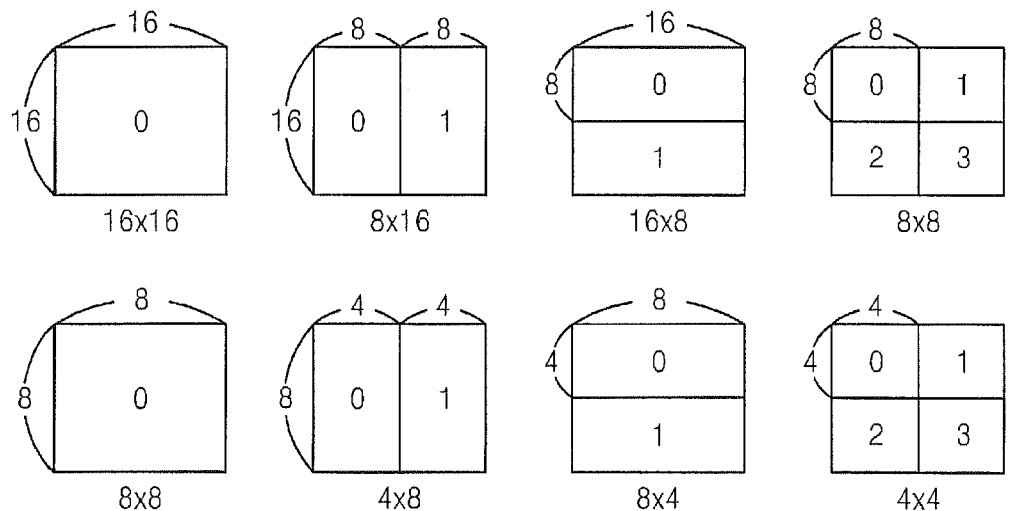
FIG. 1A illustrates blocks of different sizes used in the size-variable block motion prediction of the conventional H.264/MPEG-4 AVC.
Figure 1B:
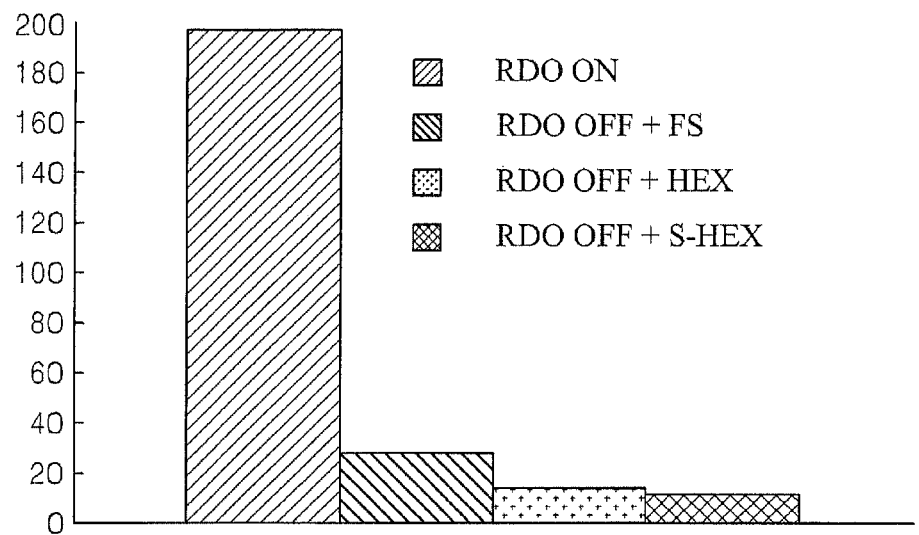
FIG. 1B illustrates a calculated complexity following an execution of the rate-distortion optimization.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

According to the H.264 image compression standard, macroblocks may be classified as in Table 1 and Table 2 below.

Table 1 shows the types and classification of the intra-block mode, and Table 2 is those of the inter-block mode.

TABLE 1

| Intra-Block Mode | Classification |
|---|---|
| Intra 16 × 16_Vertical | Large vertical intra-block mode |
| Intra 16 × 16_Horizontal | Large horizontal intra-block mode |
| Intra 16 × 16_DC | Large non-directional intra-block mode |
| Intra 16 × 16_Plane | Large non-directional intra-block mode |
| Intra 4 × 4_Vertical | Small vertical intra-block mode |
| Intra 4 × 4_Horizontal | Small horizontal intra-block mode |
| Intra 4 × 4_DC | Small non-directional intra-block mode |
| Infra 4 × 4_Diagonal Down Left | Small non-directional intra-block mode |
| Intra 4 × 4_Diagonal Down Right | Small non-directional intra-block mode |
| Intra 4 × 4_Vertical Right | Small vertical intra-block mode |
| Intra 4 × 4_Horizontal Down | Small horizontal intra-block mode |
| Infra 4 × 4_Vertical Left | Small vertical intra-block mode |
| Intra 4 × 4_Horizontal Up | Small horizontal intra-block mode |

TABLE 2

| Inter-Block Mode | Classification |
|---|---|
| Inter SKIP | Large non-directional inter-block mode |
| Inter 16 × 16 | Large non-directional inter-block mode |
| Inter 16 × 8 | Large horizontal inter-block mode |
| Inter 8 × 16 | Large vertical inter-block mode |
| Inter 8 × 8 | Small non-directional inter-block mode |
| Inter 8 × 4 | Small horizontal inter-block mode |
| Inter 4 × 8 | Small vertical inter-block mode |
| Inter 4 × 4 | Small non-directional inter-block mode |

In the present disclosure, block modes may be classified by size into 'large block modes' defining four intra-block modes of an intra 16×16_Vertical, intra 16×16_Horizontal, intra 16×16_DC, and intra 16×16_Plane, and four inter block modes of an inter SKIP, inter 16×16, inter 16×8, and inter 8×16; and 'small block modes' defining nine intra block modes of an intra 4×4_Vertical, intra 4×4_Horizontal, intra 4×4_DC, intra 4×4_Diagonal Down Left, intra 4×4_Diagonal Down Right, intra 4×4_Vertical Right, intra 4×4_Horizontal Down, intra 4×4 Vertical Left, and intra 4×4_Horizontal UP and four inter block modes of inter 8×8, inter 8×4, inter 4×8, and inter 4×4.

Additionally, in the present disclosure, block modes may be classified according to directional features into 'vertical block modes' as defined by four vertical intra block modes including an intra 16×16 Vertical, intra 4×4_Vertical, intra 4×4_Vertical Right, and intra 4×4_Vertical Left and two vertical inter block modes having an inter 8×16 and an inter 4×8; 'horizontal block modes' as defined by four horizontal intra block modes including an intra 16×16_Horizontal, intra 4×4_Horizontal, intra 4×4_Horizontal Down, and intra 4×4_Horizontal UP and two horizontal inter block modes of an inter 16×8 and an inter 8×4; and 'non-directional block modes' with neither a vertical nor a horizontal feature as defined by five intra block modes including an intra 16×16 DC, intra 16×16_Plane, intra 4×4 DC, intra 4×4_Diagonal Down Left, and intra 4×4_Diagonal Down Right and four inter block modes of an inter SKIP, inter 16×16, inter 8×8, and inter 4×4.

Therefore, the intra block modes or inter block modes shown in Tables 1 and 2 may be classified as in the 'Classification' sections depending on their respective dimensional and directional features. Specifically, for example, the 'intra 16×16 Vertical' is an intra block mode that is sized 16×16 entitled to a 'large block mode' with the vertical feature making the 'vertical block mode'. So, combining these individual features results in the 'large vertical intra-block mode' classified in Table 1. The rest intra and inter block modes are classified in this way.

Figure 2:
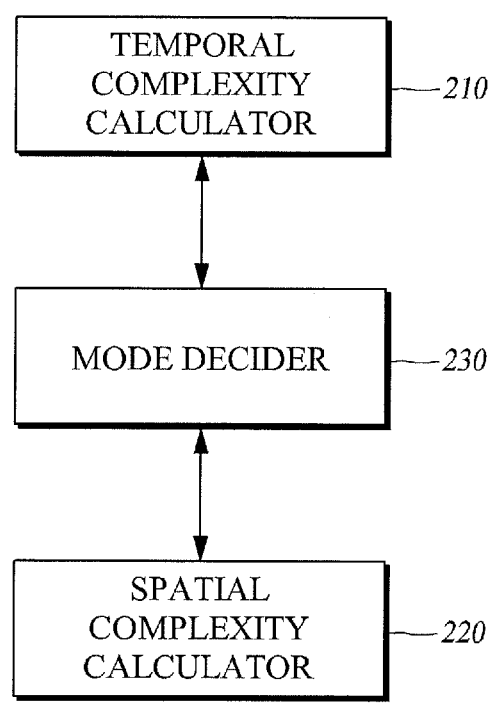
FIG. 2 is a block diagram of an electronic configuration of an encoding mode decision apparatus using temporal and spatial complexities according to an embodiment.

FIG. 2 is a block diagram of an electronic construction of the encoding mode decision apparatus using temporal and spatial complexities according to an embodiment.

The encoding mode decision apparatus of one embodiment may comprise a temporal complexity calculator 210, a spatial complexity calculator 220, and a mode decider 230.

The temporal complexity calculator 210 of an embodiment is a data processing means for executing a calculation to generate and store data and it analyzes a macroblock of an image to calculate the temporal complexity of the macroblock.

In addition, the temporal complexity calculator 210 of an embodiment calculates a block residual that is a macroblock residual and Hadamard transforms the same to calculate the temporal block complexity, which is then divided by the quantization step size to eventually calculate the temporal complexity. The calculating procedure for the temporal complexity will be described below in detail with reference to FIG. 4.

The spatial complexity calculator 220 of an embodiment is also a data processing means for performing calculations to generate and store data and it analyzes macroblocks of an image for calculating the spatial complexity of the macroblock.

In addition, the spatial complexity calculator 220 according to an embodiment of the present disclosure calculates a vertical complexity by performing vertical filtering of the macroblock and calculates a horizontal complexity by performing horizontal filtering of the macroblock and then divides the vertical plus horizontal complexities to generate a spatial block complexity, which is then divided by the quantization step size in order to calculate the spatial complexity. The calculating procedure for the spatial complexity will be described below in detail with reference to FIG. 4.

The mode decider 230 of an embodiment of the present disclosure is a data processing means for carrying out calculations to generate and store data and it utilizes the temporal complexity calculated in the temporal complexity calculator 210 and the spatial complexity from the spatial complexity calculator 220 to decide the block mode to apply in encoding.

Since a greater temporal complexity is more likely to cause the intra mode of encoding, the mode decider 230 in this embodiment may decide as encoding mode the intra block mode such as the intra 16×16_Vertical, intra 16×16_Horizontal, intra 16×16_DC, intra 16×16_Plane, intra 4×4 Vertical, intra 4×4_Horizontal, intra 4×4_DC, intra 4×4_Diagonal Down Left, and intra 4×4_Diagonal Down Right, intra 4×4_Vertical Right, intra 4×4_Horizontal Down, intra 4×4_Vertical Left, and intra 4×4_Horizontal Up; and since a less temporal complexity is more likely to cause encoding in the inter mode, the encoding mode of choice may be the inter block mode such as the inter SKIP, inter 16×16, inter 16×8, inter 8×16, inter 8×8, inter 8×4, inter 4×8, and inter 4×4.

Therefore, the mode decider 230 in this embodiment compares the temporal complexity with a predetermined temporal threshold to see if the temporal complexity exceeds the threshold and if it is true, it selects the intra block mode as the mode of encoding, and if the temporal complexity is less than or equal to the threshold, it selects the inter block mode for encoding.

According to the present disclosure, the temporal threshold may be defined as a temporal complexity of a previous macroblock in a previous frame to a current frame with the previous macroblock being equally positioned to a current macroblock contained in the current frame.

In addition, since a greater spatial complexity tends to cause a small block mode to be chosen as the encoding mode, the mode decider 230 of an embodiment at the greater spatial complexity may decide as the encoding mode the small block mode such as the intra 4×4_Vertical, intra 4×4_Horizontal, intra 4×4_DC, intra 4×4_Diagonal Down Left, and intra 4×4_Diagonal Down Right, intra 4×4_Vertical Right, intra 4×4_Horizontal Down, intra 4×4_Vertical Left, intra 4×4_Horizontal Up, inter 8×8, inter 8×4, inter 4×8, and inter 4×4; and as a less spatial complexity is more likely to cause an encoding in a large block mode, the encoding modes of choice by the mode decider 230 may be the large block mode such as the intra 16×16_Vertical, intra 16×16_Horizontal, intra 16×16_DC, intra 16×16 Plane, inter SKIP, inter 16×16, inter 16×8, and inter 8×16.

Therefore, the mode decider 230 of the embodiment can compare the spatial complexity with the predetermined spatial threshold to set the small block modes as the encoding mode at the comparatively higher spatial complexity or decide the large block encoding modes at the equal or lower spatial complexity.

In this disclosure, the spatial threshold means a spatial complexity of a previous macroblock in a previous frame with respect to a current frame with the previous macroblock being equally positioned to a current macroblock in the current frame.

Additionally, mode decider 230 of an embodiment of the present disclosure may compare the vertical complexities with the horizontal complexities of the macroblock to see if the vertical complexity is greater than the horizontal complexity where the encoding mode of choice is the vertical block mode such as the intra 16×16 Vertical, intra 4×4_Vertical, intra 4×4_Vertical Right, and intra 4×4_Vertical Left, inter 8×16, and, inter 4×8; if the vertical complexity equals to the horizontal complexity where the decoding mode is decided to be the 'non-directional block mode with no directional feature including the intra 16×16_DC, intra 16×16_Plane, intra 4×4_DC, intra 4×4_Diagonal Down Left, and intra 4×4_Diagonal Down Right, inter SKIP, inter 16×16, inter 8×8, and inter 4×4; and if the vertical complexity is less than the horizontal complexity where the mode decided to apply in encoding is the horizontal block mode such as the intra 16×16_Horizontal, intra 4×4_Horizontal, intra 4×4_Horizontal Down, and intra 4×4_Horizontal UP, inter 16×8, and inter 8×4.

In the present disclosure, the temporal complexity calculator 210, spatial complexity calculator 220, and mode decider 230 may be implemented with independent hardware components including memories for storing the respective functional programs and data and microprocessors for executing the stored programs to generate data and storing the same in the memories although the above components may be provided by the corresponding functional program modules, which are stored in the memories until they are executed by the microprocessors.

In its decision of the encoding mode, the mode decider 230 is described above as either using the temporal complexity in choosing between the intra and inter block modes, or using the spatial complexity to elect the small or large block mode, or using the vertical and horizontal complexities to elect among the vertical, non-directional, and horizontal block modes, although the respective decision methods may be combined rather than performed selectively.

For a specific example, if the temporal and spatial complexities are greater than their respective threshold values and the vertical complexity is greater than the horizontal complexity, the mode decider 230 may select, among the intra block modes, the small and vertical intra block mode (intra 4×4_Vertical, intra 4×4_Vertical Right, and intra 4×4 Vertical Left) as the encoding mode. In this case the calculation amount and the processing time to perform the rate-distortion optimization can be minimized with the encoder incorporating the present embodiment of the encoding mode decision apparatus using temporal and spatial complexities since the apparatus may only calculate the rate-distortion costs in the above three block mode selections before electing the final mode of encoding.

The still or video image compressing encoders dissect the images frame by frame before starting the encoding operation where the respective frame's images are divided into macroblocks to encode, when a concurrent decision is made on the encoding mode. In deciding the mode of encoding by the encoders, the rate-distortion optimization has been used in the H.264 video compression standard. However, the used rate-distortion optimization technique in the encoding had to be repeatedly performed in every block mode predicted as the encoding mode (i.e. the intra block modes and inter block modes) to obtain the rate-distortion cost, which exacts complex calculations and increases the burden on the encoder, thereby consuming a substantially longer time to perform the encoding operation.

In response, in the present disclosure as described above, the encoding mode may be so determined that the encoder has the minimized number of block modes in which the rate-distortion cost is calculated to cope with the inefficiency of having to deal with every block mode and the repetitive calculations.

To this effect, the encoding mode decision apparatus that can be implemented in a hardware or a software module inside an encoder and that employs the temporal and spatial complexities as described with reference to FIG. 2 is adapted to calculate the temporal complexity and the spatial complexity of a macroblock to determine the least possible number of encoding modes in which the encoder may perform the rate-distortion optimization technique to decide the final encoding mode to apply.

Below is a description on the operational process of the encoding mode decision apparatus using temporal and spatial complexities.

Figure 3:
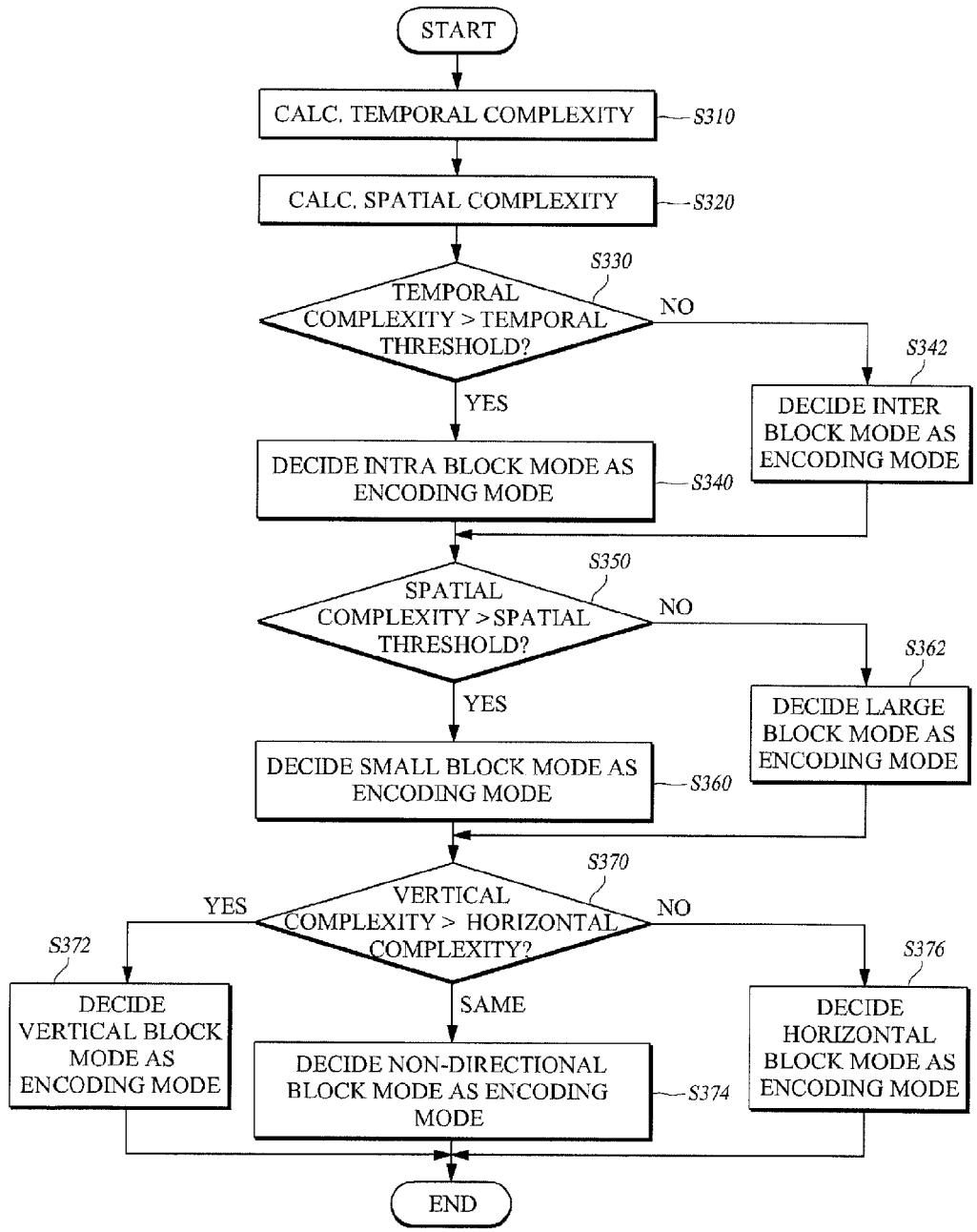
FIG. 3 is a flow diagram for illustrating an encoding mode decision method using temporal and spatial complexities according to an embodiment.

FIG. 3 is a flow diagram for illustrating a method for deciding encoding mode by using temporal and spatial complexities according to an embodiment.

The apparatus for deciding encoding mode by using temporal and spatial complexities (hereinafter simply called 'encoding mode decision apparatus') of the present disclosure calculates the temporal complexity of the macroblock at S310 and calculates the spatial complexity at S320.

Upon calculating the temporal and spatial complexities, the encoding mode decision apparatus checks to see if the temporal complexity is greater than the predetermined temporal threshold through their comparison (S330), and decides the encoding mode as the intra block mode if the temporal complexity is greater (S340) and the inter block mode if the temporal complexity is less than or equal to the temporal threshold (S342).

In other words, the encoding mode decision apparatus may rely on the condition that the temporal complexity of the current macroblock in the current frame is greater than that of the previous macroblock in the previous frame in deciding the intra block mode for encoding where the intra block mode is more probable to be the encoding mode regardless of the hassle of the rate distortion cost calculation for the encoding mode decision, and in the opposite condition it picks the inter block mode.

In addition, the encoding mode decision apparatus checks to see if the spatial complexity is greater than the predetermined spatial threshold through their comparison (S350), and decides the encoding mode as the small block mode if the spatial complexity is greater (S360) or the large block mode if the spatial complexity is less than or equal to the spatial threshold (S362).

In other words, the encoding mode decision apparatus may rely on the condition that the spatial complexity of the current macroblock in the current frame is greater than that of the previous macroblock in the previous frame in deciding the small block mode for encoding where the small block mode is more probable to be the encoding mode regardless of the hassle of the rate distortion cost calculation for the encoding mode decision, or otherwise it picks the large block mode.

Further, the encoding mode decision apparatus compares the vertical complexities with horizontal complexities included in the spatial complexity to see if the vertical complexity is greater than the horizontal complexity (S370), and decides the encoding mode as the vertical block mode if the vertical block mode is greater (S372), the non-directional block mode if the vertical and horizontal complexities are same (S374), and the horizontal block mode if the vertical complexity is less than the horizontal complexity (S376).

In other words, the encoding mode decision apparatus may rely on the condition that the vertical complexity of the current macroblock in the current frame is greater than the horizontal complexity in deciding the vertical block mode for encoding where the identical vertical block mode is more probable to become the encoding mode regardless of the hassle of the rate distortion cost calculation for the encoding mode decision, and it selects the non-directional block mode if the vertical and horizontal complexities are same or the horizontal block mode if the vertical complexity is less.

As above, the encoding mode decision apparatus may operate using the temporal complexity, the spatial complexity, and the vertical and horizontal complexities contained in the spatial complexity.

In the meantime, although FIG. 3 illustrates the encoding mode decision through the procedures of deciding the encoding mode using the temporal complexity (steps S330 thru S342), the spatial complexity (steps S350 thru S362), and both the vertical and horizontal complexities contained in the spatial complexity (steps S360 thru S376), it will be understood by the skilled persons in the art that these procedures may be executed with selected one or two above, or the three procedures altogether in a sequence, which can be arbitrary.

Therefore, assuming that, for example, the three procedures of FIG. 3 were carried out in the illustrated sequence to elect the intra block mode by using the temporal complexity, the small block mode by using the spatial complexity, and the vertical block mode by using the vertical and horizontal complexities, the conclusive block modes may become the classified 'small vertical intra block mode' in Table 1, which are intra 4×4_Vertical, intra 4×4 Vertical Right, and intra 4×4_Vertical Left. That is, it is sufficient for the encoder to calculate the rate-distortion cost in the above three modes to decide the final encoding mode in which the video compression will be made.

Additionally, if, for example, it is assumed that the encoding mode decision apparatus proceeded to elect the horizontal block mode along the steps S360 thru S376 using both the vertical and horizontal complexities and then elect the inter block mode along the steps S330 through S342 using the temporal complexity, the final selection for encoding would be 'horizontal inter block modes (i.e. 'large horizontal inter block mode' and 'small horizontal inter block mode'), which are inter 16×8 and inter 8×4. That is, the encoder may calculate the rate-distortion cost only in the above two modes to decide the final encoding mode in which the video compression will be made.

FIGS. 4A, 4B and 4C illustrate the steps of calculating the temporal and spatial complexities according to an embodiment.

FIG. 4A shows the Hadamard Transform matrix that is used to calculate the temporal complexity.

In order to calculate the temporal complexity of the macroblock, the encoding mode decision apparatus performs a motion compensation on the macroblock to remove any redundancies before it does a calculation for a residual signal matrix of a block residual by which the Hadamard Transform matrix of FIG. 4A is multiplied in the Hadamard Transform operation to complete the temporal complexity calculation. Also, the encoding mode decision apparatus calculates the temporal complexity by dividing the temporal block complexity by the quantization step size. Here, the macroblock means the 16×16 matrix having the pixel value thereof. Such a process may be mathematically expressed as Equation 2.

$$\text{Block\_Complexity} = \text{Block\_Residual} * \text{Block\_Hadamard} \quad \text{Equation 2}$$

$$\text{Temporal\_Complexity} = \left(\sum_{i=0}^{15} \text{Block\_Complexity}(i)\right) \Big/ \text{Q\_step}$$

In this disclosure, the motion compensation firstly removes the macroblock redundancy followed by additional Hadamard Transform to remove the redundancy of the residual signals once more, thereby drastically reducing errors in the actual amount of bits generated.

In other words, since Hadamard Transformation is capable of decomposing input signals into frequencies, the residual signal after Hadamard Transform may be divided into sixteen frequencies, which approximate the result of the frequency decomposition from a discrete cosine transform (DCT) used to compress signals in the process of an actual encoding operation. Therefore, the encoding mode decision apparatus can predict with a very high accuracy the amount of data that generates the differential signals against the previous frame with a temporal similarity with the use of the decomposed frequencies through Hadamard Transform, whereby calculating the temporal complexity with high accuracy.

FIG. 4B shows a vertical filter used to calculate the spatial complexity and FIG. 4C shows a horizontal filter to calculate the spatial complexity.

In order to calculate the spatial complexity, the encoding mode decision apparatus performs a vertical filtering of the macroblock by multiplying the same by the vertical filter shown in FIG. 4B to obtain the vertical complexity, and a horizontal filtering of the macroblock by multiplying the same by the horizontal filter shown in FIG. 4C. And the encoding mode decision apparatus may divide the sum of the vertical and horizontal complexities by two to obtain the spatial block complexity, which is then divided by the quantization step size to provide the spatial complexity. Here, the macroblock refers to the 16×16 matrix having the pixel value thereof. Such a process may be mathematically expressed as Equation 3.

$$\text{Vertical\_Complexity} = MacroBlock * \text{Vertical\_Filter}$$
$$\text{Horizontal\_Complexity} = MacroBlock * \text{Horizontal\_Filter}$$
$$\text{Block\_Complexity} = (\text{Vertical\_Complexity} + \text{Horizontal\_Complexity})/2$$
$$\text{Spatial\_Complexity} = \left( \frac{\sum_{i=0}^{255} \text{Block\_Complexity}(i)}{16} \right) / Q\_step$$

Equation 3

In the present disclosure, 2-dimensional five-tab filters (i.e., vertical filters and horizontal filters) are used to calculate the spatial complexity. Spatial complexity is calculated in order to predict the amount of bit generation with high accuracy in case the intra prediction is used.

Typically, in the spatial complexity calculations, differences between the adjacent pixels are obtained in a macroblock, and then the grand total of the differences are simply used to calculate the complexity. In contrast, according to the present disclosure, the 2-dimensioanally constructed high pass filter (i.e., vertical and horizontal filters) are used to perform detections by assigning weights to the significance according to the positions of the pixels in order to find the edge that may present in the input images of the encoder. Since the edge may have various directivities, the filtering is carried out using both the vertical and horizontal filters, and through the sum of the filtered outputs the edge detection is possible for the horizontal and vertical directions as well as the diagonal direction.

In addition, the present disclosure uses the quantization step size that is an important factor in the actual encoding process in controlling the bit generation, thereby calculating the spatial complexity in an extra high accuracy. Thanks to the spatial complexity calculated by adding the vertical filtered value and the horizontal filtered value of the macroblock, a dramatic reduction of errors can be achieved in the bit generation amounts and the spatial complexities which can change following the quantization width variation. This approach is used to filter out the most effective one of many prediction directions in the intra predicting, offering an improved accuracy in electing the encoding mode.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is useful in deciding an optimal encoding mode for macroblocks through the rate-distortion optimization technique, and it can be applied to the encoding mode decision method and apparatus to minimize the rate distortion cost calculations in order to calculate the temporal and spatial complexes for the macroblocks with higher accuracy as well as elect the optimal encoding mode using the same resulting in a reduction of the calculation complexity when applying the rate-distortion technique along with an improvement of its processing speed.

CROSS-REFERENCE TO RELATED APPLICATION

This application claims priorities under 35 U.S.C §119(a) on Patent Application No. 10-2008-0007666 filed in Korea on Jan. 24, 2008, the entire content of which is hereby incorporated by reference. In addition, this non-provisional application claims priorities in countries, other than the U.S., with the same reason based on the Korean Patent Application, the entire content of which is hereby incorporated by reference.

What is claimed is:

1. An encoding mode decision apparatus using a temporal complexity comprising:
a temporal complexity calculator to calculate a temporal complexity by using Hadamard transforming block residuals to obtain temporal block complexity in accordance with the following equation:

$$\text{Temporal Block Complexity} = \left( \sum_{i=0}^{n} \text{Block\_Complexity}(i) \right) / Q\_step$$

where $n$ is a number > zero and < or equal to 15;

with the temporal block complexity being divided by a quantization width; and further comprising a mode decider to decide the encoding mode utilizing the temporal complexity.

2. The encoding mode decision apparatus in claim 1, wherein the mode decider elects an intra block mode as the encoding mode if the temporal complexity is greater than a predetermined temporal threshold.

3. The encoding mode decision apparatus in claim 1, wherein the encoding mode decider decides an inter block mode as the encoding mode if the temporal complexity is less than or equal to a predetermined temporal threshold.

4. The encoding mode decision apparatus in claim 2, wherein the temporal threshold is defined as a temporal complexity of a previous macroblock in a previous frame to a current frame with the previous macroblock being equally positioned to the macroblock contained in the current frame.

5. An encoding mode decision apparatus using a spatial complexity comprising:
 a spatial complexity calculator to calculate a spatial complexity by dividing the sum of vertical and horizontal complexities of a macroblock by a quantization width in accordance with the following equation:

$$\text{Spatial\_Complexity} = \left(\frac{\sum_{i=0}^{n} \text{Block\_Complexity}(i)}{16}\right) \Big/ \text{Q\_step}$$

where n is a number > zero and < or equal to 255; and
 a mode decider to decide the encoding mode utilizing the spatial complexity.

6. The encoding mode decision apparatus in claim 5, wherein the mode decider elects a small block mode as the encoding mode if the spatial complexity is greater than a predetermined spatial threshold.

7. The encoding mode decision apparatus in claim 5, wherein the mode decider elects a large block mode as the encoding mode if the spatial complexity is less than or equal to a predetermined spatial threshold.

8. The encoding mode decision apparatus in claim 6, wherein the spatial threshold is defined as a spatial complexity of a previous macroblock in a previous frame to a current frame with the previous macroblock being equally positioned to the macroblock contained in the current frame.

9. The encoding mode decision apparatus in claim 5, wherein the spatial complexity comprises a vertical and a horizontal complexity of the macroblock and wherein the mode decider decides a vertical block mode as the encoding mode if the vertical complexity is greater than the horizontal complexity.

10. The encoding mode decision apparatus in claim 5, wherein the spatial complexity comprises vertical and horizontal complexities of the macroblock and wherein the mode decider decides a non-directional block mode as the encoding mode if the vertical complexity is equal to the horizontal complexity.

11. The encoding mode decision apparatus in claim 5, wherein the spatial complexity comprises vertical and horizontal complexities of the macroblock and wherein the mode decider decides a horizontal block mode as the encoding mode if the vertical complexity is less than the horizontal complexity.

12. An encoding mode decision method using temporal and spatial complexities, the method comprising and performing through an encoding mode decision apparatus:
 calculating a temporal complexity by Hadamard transforming block residuals to obtain temporal block complexity in accordance with the following equation:

$$\text{Temporal Block Complexity} = \left(\sum_{i=0}^{n} \text{Block\_Complexity}(i)\right) \Big/ \text{Q\_step}$$

where $n$ is a number > zero and < or equal to 15;
 and
 dividing the temporal block complexity by a quantization width;
 calculating a spatial complexity by dividing the sum of vertical and horizontal complexities of a macroblock by a quantization width in accordance with the following equation:

$$\text{Spatial\_Complexity} = \left(\frac{\sum_{i=0}^{n} \text{Block\_Complexity}(i)}{16}\right) \Big/ \text{Q\_step}$$

where n is a number > zero and < or equal to 255;
 electing an intra block mode as the encoding mode if the temporal complexity is greater than a predetermined temporal threshold; and
 electing an inter block mode as the encoding mode if the temporal complexity is less than or equal to the temporal threshold.

13. The encoding mode decision method in claim 12, further comprising, after the calculating of the spatial complexity:
 deciding a small block mode as the encoding mode if the spatial complexity is greater than a predetermined spatial threshold; and
 deciding a large block mode as the encoding mode if the spatial complexity is less than or equal to the spatial threshold.

14. The encoding mode decision method in claim 13, further comprising, after the calculating of the spatial complexity:
 comparing between vertical and horizontal complexities of the macroblock using the spatial complexity;
 if a vertical complexity of the macroblock is greater than its horizontal complexity, electing a vertical block mode as the encoding mode;
 if vertical complexity of the macroblock is equal to the horizontal complexity, electing a non-directional block mode as the encoding mode; and
 if a vertical complexity of the macroblock is less than the horizontal complexity, electing a horizontal block mode as the encoding mode.

15. The encoding mode decision apparatus in claim 3, wherein the temporal threshold is defined as a temporal complexity of a previous macroblock in a previous frame to a current frame with the previous macroblock being equally positioned to the macroblock contained in the current frame.

16. The encoding mode decision apparatus in claim 7, wherein the spatial threshold is defined as a spatial complexity of a previous macroblock in a previous frame to a current frame with the previous macroblock being equally positioned to the macroblock contained in the current frame.

* * * * *